(12) United States Patent
Takahashi et al.

(10) Patent No.: US 6,747,093 B2
(45) Date of Patent: Jun. 8, 2004

(54) MOISTURE-CURING REACTIVE HOT-MELT ADHESIVE FOR WEATHER STRIP FLOCKING, FLOCKED WEATHER STRIP, AND PROCESS FOR PRODUCING FLOCKED WEATHER STRIP

(75) Inventors: Shin Takahashi, Aichi (JP); Masashi Yamada, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 313 days.

(21) Appl. No.: 09/908,708

(22) Filed: Jul. 20, 2001

(65) Prior Publication Data
US 2002/0010302 A1 Jan. 24, 2002

(30) Foreign Application Priority Data
Jul. 21, 2000 (JP) ........................................ 2000-221463

(51) Int. Cl.[7] .......................... C08L 75/04; C08K 5/54; C08G 18/10; B05D 3/02
(52) U.S. Cl. ........................ 524/590; 524/261; 528/66; 427/385.5; 49/475.1
(58) Field of Search ................................ 524/261, 590; 528/66; 427/385.5; 49/475.1

(56) References Cited

U.S. PATENT DOCUMENTS 5,045,393 A * 9/1991 Kumanoya et al. ......... 428/353
5,155,180 A * 10/1992 Takada et al. .............. 525/440
5,939,488 A * 8/1999 Nowicki et al. ............. 525/59

FOREIGN PATENT DOCUMENTS

JP 5-96670 A 4/1998

* cited by examiner

Primary Examiner—Tae H. Yoon
(74) Attorney, Agent, or Firm—Sughrue Mion, PLLC

(57) ABSTRACT

An adhesive, a flocked weather strip, and a process for producing the weather strip. The adhesive is a moisture-curing reactive hot-melt adhesive for weather strip flocking, which comprises as the main component a urethane prepolymer containing isocyanate groups, the adhesive having a dielectric constant at 25° C. of 3 to 10 and a melting point of 40° C. to 150° C. The flocked weather strip comprises a substrate and piles flocked thereon through the moisture-curing reactive hot-melt adhesive. The process for producing the flocked weather strip comprises thermally melting the moisture-curing reactive hot-melt adhesive, applying the melt to a substrate in a thickness of 40 to 150 μm, electrostatically flocking piles in the resulting layer of the molten adhesive, cooling the adhesive to solidify the same and fix the flocks to the substrate, and then cutting the substrate into a given size. The adhesive is suitable for use in the flocking of a weather strip substrate and enables piles flocked in a melt of the adhesive to tenaciously bond to the weather strip substrate in a short period of time. The weather strip has excellent sliding resistance and is especially suitable for use in motor vehicles.

9 Claims, No Drawings

MOISTURE-CURING REACTIVE HOT-MELT ADHESIVE FOR WEATHER STRIP FLOCKING, FLOCKED WEATHER STRIP, AND PROCESS FOR PRODUCING FLOCKED WEATHER STRIP

FIELD OF THE INVENTION

The present invention relates to a moisture-curing reactive hot-melt adhesive for weather strip flocking, a flocked weather strip, and a process for producing the flocked weather strip. The weather strip is obtained by flocking on a sliding side thereof to a glass or the like, and is especially suitable for use in motor vehicles.

DESCRIPTION OF THE RELATED ART

In a general technique for weather strip production, weather strips having a side on which a glass is to be slid are flocked on the sliding side in order to reduce sliding resistance and secure sealing properties.

Adhesives for flocking generally include an emulsion type and a solvent-based type. However, adhesives used for weather strip flocking are generally of a two-pack solvent-based type and a one-pack solvent-based type from the standpoints of adhesion to substrates and water resistance.

Conventional processes for producing a flocked weather strip using those adhesives comprise applying an adhesive in a given thickness to a substrate on its side to be the sliding side of a weather strip, electrostatically flocking piles in the adhesive layer, cutting the pile-flocked substrate into strips of a given size while being nipped in areas along the cutting lines, heating the adhesive to remove a solvent and cure the adhesive, and then cutting off both edges of each strip which have been impaired in the raised state as a result of the deformation caused by nipping during the cutting.

The reason why cutting is conducted before drying is that since drying requires about 10 minutes, a drying oven necessitates a large space and should be as long as 100 m when line speed is, for example, 10 m/min. Usually, a drying line having a width such that flocked weather strips cut into a given size can be transported thereon extends perpendicularly to the flocking line.

JP-A-5-96670 (the term "JP-A" as used herein means an "unexamined published Japanese patent application") discloses a flocked material obtained by electrostatically flocking a substrate with piles through an adhesive comprising a urethane prepolymer. However, the urethane prepolymer described in the above publication is unclear in crystallinity.

In the case where the solvent-based adhesives are used, the flocked substrate is cut before drying while being nipped in areas along the cutting lines, so that both edges of each resulting strip, which have deformed during the cutting, should be cut off and discarded. These edges to be discarded account for about 10% of the total production of locking. Consequently, the conventional process not only has a loss of about 10% in variable cost and processing cost, but also yields wastes.

In addition, since a solvent is handled, the conventional process always has problems concerning worsening of the working atmosphere and possibility of catching fire and necessitates a high cost of light and heat for drying the adhesive.

In the case of using a two-pack type adhesive, there also is a problem concerning curing failures attributable to hardener mixing errors.

SUMMARY OF THE INVENTION

Accordingly, one object of the invention is to provide a flocked weather strip free from the problems described above.

Another object of the invention is to provide a process for producing the weather strip.

Still another object of the invention is to provide an adhesive composition for use in flocking.

As a result of intensive investigations to overcome the problems described above, it has been found that a specific moisture-curing reactive hot-melt adhesive comprising as the main component a urethane prepolymer containing isocyanate groups is useful for the electrostatic flocking of weather strip substrates made of PVC or another material with piles. The invention has been completed based on this finding.

According to a first embodiment of the invention, there is provided a moisture-curing reactive hot-melt adhesive for weather strip flocking, which comprises as the main component a urethane prepolymer containing isocyanate groups, the hot-melt adhesive having a dielectric constant at 25° C. of 3 to 10 and a melting point of 40° C. to 150° C.

In one preferred embodiment of the moisture-curing reactive hot-melt adhesive for weather strip flocking of the invention, it has a tack-free time of 10 minutes or shorter as measured by the following test method:

Test Method

An adhesive melted by heating at 120±5° C. is uniformly applied to a 100 $\mu$m-thick poly(ethylene terephthalate) film in a thickness of 100±10 $\mu$m to form a square adhesive layer having dimensions of 1 cm by 1 cm. The film having the adhesive layer is immediately placed in a thermostatic chamber maintained at 25±1° C. and allowed to stand therein. The time required for the adhesive layer to become tack-free is measured based on touching to the surface thereof with a finger.

In another preferred embodiment of the moisture-curing reactive hot-melt adhesive for weather strip flocking of the invention, it contains a silane coupling agent in an amount of 1 to 20% by weight based on the total weight of the adhesive.

According to a second embodiment of the invention, there is provided a flocked weather strip comprising a substrate flocked through the moisture-curing reactive hot-melt adhesive described above.

According to a third embodiment of the invention, there is provided a process for producing a flocked weather strip which comprises thermally melting the moisture-curing reactive hot-melt adhesive described above, applying the melt to a substrate in a thickness of 40 to 150 $\mu$m, electrostatically flocking the resulting layer of the molten adhesive with piles, cooling the adhesive to solidify the same, thereby fixing the piles to the substrate, and then cutting the substrate into a given size.

The adhesive of the invention is suitable for use in the flocking of a weather strip substrate and enables the piles flocked in a melt of the adhesive to strongly bond to the weather strip substrate in a short period of time.

The weather strip of the invention has excellent sliding resistance and is especially suitable for use in motor vehicles.

The process for producing a flocked weather strip according to the invention gives a flocked weather strip in which piles after flocking have a sufficient strength with respect to the retention of the raised state and, hence, do not deform when a nipping stress is applied thereto in cutting. Because of this, the process is free from the losses and wastes accompanying the use of a solvent-based adhesive. Since the process uses a solvent-free adhesive, it not only is free from worsening of the working atmosphere and possibility of catching fire, but also is effective in reducing the cost of light and heat because no drying step is necessary. Furthermore, since the adhesive is of the one-pack type, the process is free from curing failures attributable to hardener mixing errors which may occur in the case of using a two-pack type solvent-based adhesive.

DETAILED DESCRIPTION OF THE INVENTION

The present invention is described in detail below.

1. Adhesive

The adhesive used in the invention is a moisture-curing reactive hot-melt adhesive for weather strip flocking which comprises as the main component a urethane prepolymer containing isocyanate groups.

The adhesive used in the invention has a content of the urethane prepolymer containing isocyanate groups of preferably 60% by weight or higher, more preferably 70% by weight or higher, based on the total weight of the adhesive.

The urethane prepolymer containing isocyanate groups is an isocyanate-terminated urethane prepolymer obtained by reacting one or more polyols having two or more hydroxyl groups in the molecule with one or more polyisocyanates having two or more isocyanate groups in the molecule. The urethane prepolymer has a weight average molecular weight of 2,000 to 50,000. Such urethane prepolymers may be used alone or in combination of two or more thereof.

1.1. Polyols

The polyols used as a starting material for the urethane prepolymer are compounds having two or more, and preferably up to five, hydroxyl groups in the molecule. Conventional polyols can be used. Preferred examples the polyols used in the invention are shown below.

1.1.1. Polyester Polyol

A polyester polyol is a polyol obtained by random condensation copolymerization of one or more polycarboxylic acids with one or more polyols.

The polycarboxylic acids preferably have two or more carboxyl groups in the molecule and 4 to 24 carbon atoms. Preferred examples the polycarboxylic acid include succinic acid, adipic acid, pimelic acid, suberic acid, azelaic acid, sebacic acid, dodecanedioic acid, eicosanedioic acid, ε-caprolactone, terephthalic acid, isophthalic acid, phthalic anhydride, 2, 6-naphthalenedicarboxylic acid, trimellitic acid and p-hydroxybenzoic acid.

The polyols preferably have two or more hydroxyl groups in the molecule and a weight average molecular weight of 60 to 10,000. Preferred examples such a polyol include ethylene glycol, propylene glycol, 1,4-butanediol, 1,5-pentanediol, 1,6-hexanediol, diethylene glycol, neopentyl glycol, polyethylene glycol, polypropylene glycol, polytetramethylene glycol, 1,4-cyclohexanedimethanol, trimethylolpropane, pentaerythritol and 1,2,6-hexanetriol.

1.1.2. Polyether Polyol

A polyether polyol is a polyol having one or more ether bonds in the molecule. A polyether polyol having a weight average molecular weight of 200 to 10,000 is preferably used. Preferred examples of such a polyether polyol include polyethylene glycol, polypropylene glycol and polytetramethylene glycol.

1.1.3. Polyolefin Polyol

A polyolefin polyol is a polyol having a polyolefin framework in the molecule. A polyolefin polyol having a weight average molecular weight of 200 to 10,000 is preferably used. Preferred examples of such a polyolefin polyol include hydrogenated polyalkylene polyols such as hydrogenated polybutadiene polyol or hydrogenated polyisoprene polyol, and copolymers thereof with α-olefins.

1.1.4. Other Polyols

Other examples of the polyols include polyalkylene polyols such as polybutadiene polyol or polyisoprene polyol, and polycarbonate polyols.

1.2. Polyisocyanates

The polyisocyanates used as a starting material for the urethane prepolymer are compounds having two or more isocyanate groups in the molecule. Conventional polyisocyanates can be used. Preferred examples of the polyisocyanate include p-phenylene diisocyanate, 4,4'-diphenylmethane diisocyanate, tolylene diisocyanate, 4,4'-diphenylene diisocyanate, 1,5-octylene diisocyanate, trimethylene diisocyanate, tetramethylene diisocyanate, hexamethylene diisocyanate, pentamethylene diisocyanate, 1,3-cyclopentane diisocyanate, 1,4-cyclohexane diisocyanate, 4,4'-methylenebis(cyclohexyl isocyanate), methyl-2,4-cyclohexane diisocyanate, methyl-2,6-cyclohexane diisocyanate, diphenylmethane diisocyanate, 1,4-bis(isocyanatomethyl)cyclohexane, 1,3-bis(isocyanatomethyl)cyclohexane, isophorone diisocyanate and a carbodiimide-modified 4,41'-diphenylmethane diisocyanate.

In producing the urethane prepolymer used in the invention, one or more polyols and one or more polyisocyanates are charged into a reactor in proportions such that an equivalent ratio of the amount of isocyanate groups to that of hydroxyl groups is preferably 1 to 5, more preferably 1.5 to 3.

1.3. Silane Coupling Agent

Incorporation of a silane coupling agent into the adhesive of the invention is effective in improving the adhesion of the adhesive to weather strip substrates and in imparting improved water resistance and improved sliding resistance to the flocked weather strip obtained with the adhesive.

Preferred examples of the silane coupling agent include γ-glycidoxypropyltrimethoxysilane, γ-glycidoxytriethoxysilane, β-(3,4-epoxycyclohexyl)ethyltrimethoxysilane, γ-aminopropyltriethoxysilane, N-β-(aminoethyl)-β-aminopropyltrimethoxysilane, γ-mercaptopropyltrimethoxysilane, vinyltriethoxysilane, vinyltrimethoxysilane, γ-methacryloxypropyltrimethoxysilane and γ-methacryloxypropyltri(β-methoxyethoxy)silane. Of these, the epoxy-containing organic alkoxysilanes are particularly preferable.

An amount of the silane coupling agent added in the invention is preferably 1 to 20% by weight based on the total weight of the adhesive. If the amount of the silane coupling agent added is smaller than 1% by weight, sufficient water resistance cannot be obtained. On the other hand, amounts thereof exceeding 20% by weight may not only pose a problem concerning stability of the adhesive after addition of the silane coupling agent but also result in the enhanced odor of the vaporized silane coupling agent during thermal melting, leading to worsening of the working atmosphere.

For the purpose of enhancing the moisture reactivity of the adhesive of the invention, a catalyst such as a tertiary amine compound or a tin compound may be added to the adhesive. Further, ingredients such as a tackifier, filler, plasticizer, wax, stabilizer or antioxidant may be added to the adhesive if required and necessary. The amounts of these ingredients added can suitably be adjusted in an ordinary manner. A preferred range of the total amount of such optional ingredients is 1 to 30% by weight based on the weight the adhesive of the invention.

1.4. Relative Permittivity and Melting Point of Adhesive

The relationship between the dielectric constant of the adhesive of the invention and the retention of the raised state of electrostatically flocked piles was investigated. As a result, it was found that the higher the dielectric constant, the better the retention of the raised state of piles flocked. Specifically, an excellent raised state with an appearance having no shining areas is obtained when the adhesive has a dielectric constant of 3 to 10, preferably 3.2 to 9. If an adhesive having a dielectric constant lower than 3 is used, not only the degree of flocking of piles which can be electrostatically flocked is small, but the resulting flocked product has poor sliding resistance.

The dielectric constant of an adhesive means that of a solid adhesive which has not undergone moisture curing, and is determined at a frequency of 1 MHz in an atmosphere having a temperature of 25° C. and a relative humidity of 50%.

The urethane prepolymer, which has a melting point, is a crystalline solid at the temperatures lower than its melting point. The prepolymer therefore is characterized in that when the resin in a molten state solidifies, the viscosity thereof abruptly increases at the melting point. Consequently, flocking is conducted in the following manner. When an adhesive layer applied to a substrate is in a molten state, piles are electrostatically flocked therein. The adhesive layer is then solidified by cooling. As a result, the adhesive crystallizes and the resulting piles are tenaciously bonded to the adhesive layer. Thus, a raised pile state having an initial strength which enables the pile to withstand a nipping stress during cutting can easily be obtained.

Specifically, by regulating the adhesive so as to have a melting point of 40° C. or higher, a sufficient initial strength of a raised pile state can be obtained due to the solid state of the adhesive at ordinary temperature and also the cohesive force thereof obtained through crystallization. If an adhesive having a melting point lower than 40° C. is used, a sufficient initial strength of a raised pile state cannot be obtained at ordinary temperature and the resulting pile deforms upon nipping. Consequently, it is necessary to cut off both edges from each strip, resulting in a loss.

The melting point of an adhesive can be determined by examining the adhesive with a microscope for melting while heating the adhesive from room temperature at a rate of 1° C./min.

1.5. Melt Viscosity and Tack-free Time of Adhesive

The adhesive of the invention has a melt viscosity of preferably 200 to 100,000 mPa·s/120° C., more preferably 1,000 to 50,000 mPa·s/120° C.

The melt viscosity can easily be measured with a Brookfield type viscometer.

The adhesive of the invention has a tack-free time of generally 10 minutes or shorter, preferably 5 minutes or shorter.

The tack-free time of an adhesive can be measured by the following method.

The adhesive melted by heating at 120±5° C. is uniformly applied to a 100 μm-thick poly (ethylene terephthalate) film in a thickness of 100±10 μm to form a square adhesive layer having dimensions of 1 cm by 1 cm. The film having the adhesive layer is immediately placed in a thermostatic chamber maintained at 25±1° C. and allowed to stand therein. The time required for the adhesive layer to become tack-free is then measured based on touching to the surface thereof with a finger.

2. Flocked Weather Strip

A flocked weather strip can be obtained by subjecting a substrate to flocking through the adhesive of the invention. In the weather strip of the invention, the pile is tenaciously bonded to the substrate with the adhesive of the invention. The strip is hence excellent in water resistance and sliding resistance.

3. Process for Producing Flocked Weather Strip

The moisture-curing reactive hot-melt adhesive melted by heating is applied to a weather strip substrate on its sliding side with a roll coater or the like in a thickness of 40 to 150 μm. Piles are electrostatically flocked in the resulting layer of the molten adhesive in a flocking step. The moisture-curing reactive hot-melt adhesive is then solidified by cooling to thereby fix the piles and simultaneously eliminate the surface tack of the adhesive. The resulting pile-flocked substrate is cut into a given size, whereby a flocked weather strip is produced. If the thickness of the adhesive applied is smaller than 40 μm, the pile flocked in the adhesive layer cannot have a sufficient fixing strength. If the thickness thereof exceeds 150 μm, a prolonged time is necessary for cooling and solidification, resulting in an elongation of the production line, an increased equipment cost, and the necessity of extending the production line space.

The present invention will be described below in more detail by reference to the following Examples and Comparative Example.

Values of dielectric, melting point, melt viscosity and tack-free time given in the Examples and Comparative Example were obtained by the methods described hereinabove.

EXAMPLE 1

84 Parts by weight of a polyester polyol having a number average molecular weight of 2,000 obtained by polycondensation of adipic acid with 1,6-hexanediol was reacted with 16 parts by weight of 4,4'-diphenylmethane diisocyanate to obtain an isocyanate-terminated prepolymer. 10 Parts by weight of γ-glycidoxypropyltrimethoxysilane were compounded with 100 parts by weight of the resulting isocyanate-terminated prepolymer to obtain a hot-melt adhesive based on an isocyanate-terminated polyurethane.

This adhesive had a dielectric constant of 3.7 and a melting point of about 50° C. The adhesive further had a melt viscosity of 5,000 mPa·s/120° C. and a tack-free time of 2 minutes.

This adhesive was melted at 120° C., and the melt was applied to a sliding side of a weather strip part made of polyvinyl chloride (PVC) with a roll coater in a thickness of 100 μm. Immediately thereafter, piles were electrostatically flocked in the adhesive layer to obtain a test piece. At 2 minutes after the adhesive application, the piles were pressed with a finger. As a result, the raised state of the piles was retained. This test piece was dipped in water for 72 hours and then rubbed with a fingernail to examine sliding resistance. As a result, the piles were ascertained to be free from flock falling.

EXAMPLE 2

88 Parts by weight of a polyester polyol having a number average molecular weight of 3,000 obtained by polycondensation of adipic acid with 1,6-hexanediol was reacted with 12 parts by weight of 4,4'-diphenylmethane diisocyanate to obtain an isocyante-terminated prepolymer. 10 Parts by weight of γ-glycidoxypropyltrimethoxysilane were compounded with 100 parts by weight of the resulting isocyanate-terminated prepolymer to obtain a hot-melt adhesive based on an isocyanate-terminated polyurethane.

This adhesive had a dielectric constant of 3.7 and a melting point of 50° C. The adhesive further had a melt viscosity of 9,000 mPa·s/120° C. and a tack-free time of 45 seconds.

This adhesive was melted at 120° C., and the melt was applied to a sliding side of a weather strip part made of PVC with a roll coater in a thickness of 100 μm. Immediately thereafter, piles were electrostatically flocked in the adhesive layer to obtain a test piece. At two minutes after the adhesive application, the piles were pressed with a finger. As a result, the raised state of the piles was retained. This test piece was dipped in water for 72 hours and then rubbed with a fingernail to examine sliding resistance. As a result, the piles were ascertained to be free from flock falling.

EXAMPLE 3

83 Parts by weight of a polyol mixture of a polyester polyol having a number average molecular weight of 2,000 obtained by polycondensation of adipic acid with 1,6-hexanediol and a polyoxypropylene glycol having a number average molecular weight of 1,000 in a weight ratio of 70/30 was reacted with 17 parts by weight of 4,4'-diphenylmethane diisocyanate to obtain an isocyante-terminated prepolymer. 2 Parts by weight of γ-glycidoxypropyltrimethoxysilane were compounded with 100 parts by weight of the resulting isocyanate-terminated prepolymer to obtain a hot-melt adhesive based on an isocyanate-terminated polyurethane.

This adhesive had a dielectric constant of 4.6 and a melting point of 42° C.

This adhesive was melted at 120° C., and the melt was applied to a sliding side of a weather strip part with a roll coater in a thickness of 100 μm. Immediately thereafter, piles were electrostatically flocked in the adhesive layer to obtain a test piece. At two minutes after the adhesive application, the piles were pressed with a finger. As a result, the raised state of the piles was retained.

COMPARATIVE EXAMPLE 1

85 Parts by weight of a hydrogenated polybutadiene polyol having a number average molecular weight of 2,000 and a melting point of 65° C. was reacted with 15 parts by weight of hexamethylene diisocyanate to obtain a hot-melt adhesive based on an isocyanate-terminated polyurethane.

This adhesive had a dielectric constant of 2.8 and a melting point of 42° C.

This adhesive was melted at 120° C., and the melt was applied to a sliding side of a weather strip part with a roll coater in a thickness of 100 μm. Immediately thereafter, piles were electrostatically flocked in the adhesive layer to obtain a test piece. At two minutes after the adhesive application, the piles were pressed with a finger. As a result, the raised state of the piles was completely lost.

COMPARATIVE EXAMPLE 2

88 Parts by weight of a polyol mixture of a hydrogenated polybutadiene polyol having a number average molecular weight of 2,000 and a melting point of 65° C. and a liquid hydrogenated polybutadiene polyol having a number average molecular weight of 2,000 in a weigh ratio of 50/50 was reacted with 12 parts by weight of hexamethylene diisocyanate to obtain a hot-melt adhesive based on an isocyanate-terminated polyurethane.

This adhesive had a dielectric constant of 2.9 and a melting point of 40° C.

This adhesive was melted at 120° C., and the melt was applied to a sliding side of a weather strip part with a roll coater in a thickness of 100 μm. Immediately thereafter, piles were electrostatically flocked in the adhesive layer to obtain a test piece. At two minutes after the adhesive application, the piles were pressed with a finger. As a result, the raised state of the piles was partially maintained, but the entire raised state was not sufficient. The degree of close piles flocked on the surface of the weather strip was low as compared with that in the Examples. Therefore, when the test piece was irradiated with light of a fluorescent lighting from an oblique direction, its reflection light was strong as compared with the test pieces obtained in the Examples, and reflection image of the fluorescent lighting could be observed thereon.

What is claimed is:

1. A moisture-curing reactive hot-melt adhesive for weather strip flocking, which comprises a urethane prepolymer as the main component, which contains isocyanate groups, and a silane coupling agent in an amount of 1 to 20% by weight based on the total weight of the adhesive, wherein said adhesive has a dielectric constant at 25° C. of 3 to 10, a melting point of 40° C. to 150° C. and a melt viscosity of 200 to 100,000 mPa·s/120° C.

2. The moisture-curing reactive hot-melt adhesive for weather strip flocking as claimed in claim 1, wherein said urethane prepolymer containing isocyanate groups is a reaction product of at least one polyol selected from the group consisting of polyester polyols, polyether polyols and polyolefin polyols, with at least one polyisocyanate.

3. The moisture-curing reactive hot-melt adhesive for weather strip flocking as claimed in claim 2, wherein said polyester polyol is a reaction product of at least one polycarboxylic acid having 4 to 24 carbon atoms with at least one polyol having a weight average molecular weight of 60 to 10,000.

4. The moisture-curing reactive hot-melt adhesive for weather strip flocking as claimed in claim 2, wherein said polyether polyol has a weight average molecular weight of 200 to 10,000.

5. The moisture-curing reactive hot-melt adhesive for weather strip flocking as claimed in claim 2, wherein said polyolefin polyol has a weight average molecular weight of 200 to 10,000.

6. The moisture-curing reactive hot-melt adhesive for weather strip flocking as claimed in claim 1, wherein said urethane prepolymer containing isocyanate groups has a weight average molecular weight of 2,000 to 50,000.

7. The moisture-curing reactive hot-melt adhesive for weather strip flocking as claimed in claim 1, which has a tack-free time of 10 minutes or shorter, as measured by a test method wherein an adhesive melted by heating at 120±5° C. is uniformly applied to a 100 μm-thick poly(ethylene terephthalate) film in a thickness of 100±10 μm to form a square adhesive layer having dimensions of 1 cm by 1 cm, the film having the adhesive layer is immediately placed in a thermostatic chamber maintained at 25±1° C. and allowed to stand therein, and the time required for the adhesive layer to become tack-free is measured based on touching to the surface thereof with a finger.

8. A flocked weather strip comprising a substrate and piles flocked thereon through the moisture-curing reactive hot-melt adhesive as claimed in claim 1.

9. A process for producing a flocked weather strip, which comprises thermally melting the moisture-curing reactive hot-melt adhesive as claimed in claim 1, applying the resulting melt to a substrate in a thickness of 40 to 150 μm, electrostatically flocking piles in the resulting layer of the molten adhesive, cooling the adhesive to solidify the same and fix the piles to the substrate, and then cutting the substrate into a given size.

* * * * *